United States Patent
Aoki

(10) Patent No.: US 10,064,042 B2
(45) Date of Patent: Aug. 28, 2018

(54) COMMUNICATION APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Hitoshi Aoki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/255,499

(22) Filed: Sep. 2, 2016

(65) Prior Publication Data
US 2017/0094496 A1   Mar. 30, 2017

(30) Foreign Application Priority Data

Sep. 24, 2015   (JP) ................................. 2015-187444

(51) Int. Cl.
*H04W 4/00*    (2018.01)
*H04W 8/00*    (2009.01)
(Continued)

(52) U.S. Cl.
CPC ............. *H04W 8/005* (2013.01); *H04L 69/28* (2013.01); *H04L 67/104* (2013.01); *H04W 48/14* (2013.01);
(Continued)

(58) Field of Classification Search
CPC ..... H04W 8/005; H04W 84/12; H04W 88/06; H04W 48/14; H04W 76/023; H04W 72/121; H04L 69/28; H04L 67/104
See application file for complete search history.

(56) References Cited

U.S. PATENT DOCUMENTS

| 9,143,979 | B1 | 9/2015 | Lambert |
| 2014/0192681 | A1* | 7/2014 | Hong .................... H04W 8/005 370/254 |

(Continued)

FOREIGN PATENT DOCUMENTS

| EP | 2723108 | 4/2014 |
| EP | 2755411 | 7/2014 |

(Continued)

OTHER PUBLICATIONS

Counterpart European Search Report, European Application No. 16001706.7, dated Jan. 30, 2017.
(Continued)

*Primary Examiner* — Barry W Taylor
(74) *Attorney, Agent, or Firm* — Fitzpatrick, Cella, Harper & Scinto

(57) ABSTRACT

A communication apparatus includes a first search unit that searches, in one channel, for another communication apparatus by a first method complying with Wi-Fi Alliance Neighbor Awareness Networking, and a second search unit that searches, over a plurality of channels, for another communication apparatus by a second method different from the first method. The communication apparatus accepts a search instruction of the other communication apparatus and controls, in response to accepting the one instruction, the first search unit and the second search unit so as to execute a search by the first method and a search by the second method.

18 Claims, 11 Drawing Sheets

(51) Int. Cl.
*H04L 29/06* (2006.01)
*H04L 29/08* (2006.01)
*H04W 48/14* (2009.01)
*H04W 72/12* (2009.01)
*H04W 84/12* (2009.01)
*H04W 88/06* (2009.01)

(52) U.S. Cl.
CPC .......... *H04W 72/121* (2013.01); *H04W 84/12* (2013.01); *H04W 88/06* (2013.01)

(56) References Cited

U.S. PATENT DOCUMENTS

| | | | |
|---|---|---|---|
| 2015/0036540 A1 | 2/2015 | Kasslin et al. ................ 370/254 |
| 2015/0319235 A1* | 11/2015 | Liu .................. H04W 72/0446 709/204 |
| 2016/0065667 A1 | 3/2016 | Aoki ............................ 709/219 |
| 2016/0127996 A1* | 5/2016 | Patil ..................... H04W 48/16 370/311 |
| 2016/0165376 A1* | 6/2016 | Qi ......................... H04W 4/003 455/414.1 |
| 2016/0286395 A1* | 9/2016 | Adrangi ................ H04W 12/06 |
| 2016/0353470 A1* | 12/2016 | Liu ..................... H04L 65/4076 |
| 2017/0006117 A1* | 1/2017 | Kafle .................... H04B 17/318 |
| 2017/0134182 A1* | 5/2017 | Davis .................. H04L 12/2829 |

FOREIGN PATENT DOCUMENTS

| | | |
|---|---|---|
| EP | 2884775 | 6/2015 |
| EP | 3013110 | 4/2016 |

OTHER PUBLICATIONS

Joh Hangki et al: "A hybrid Wi-Fi P2P with bluetooth low energy for optimizing smart device's communication prop",Peer-To-Peer Networking and Applications,Springer, US,vol. 8, No. 4, Apr. 25, 2014 (Apr. 25, 2014), pp. 567-577, XP035489019, ISSN: 1936-6442, DOI:10.1007/S12083-014-0276-0 [retrieved on Apr. 25, 2014] pp. 1-11.

* cited by examiner

F I G. 3
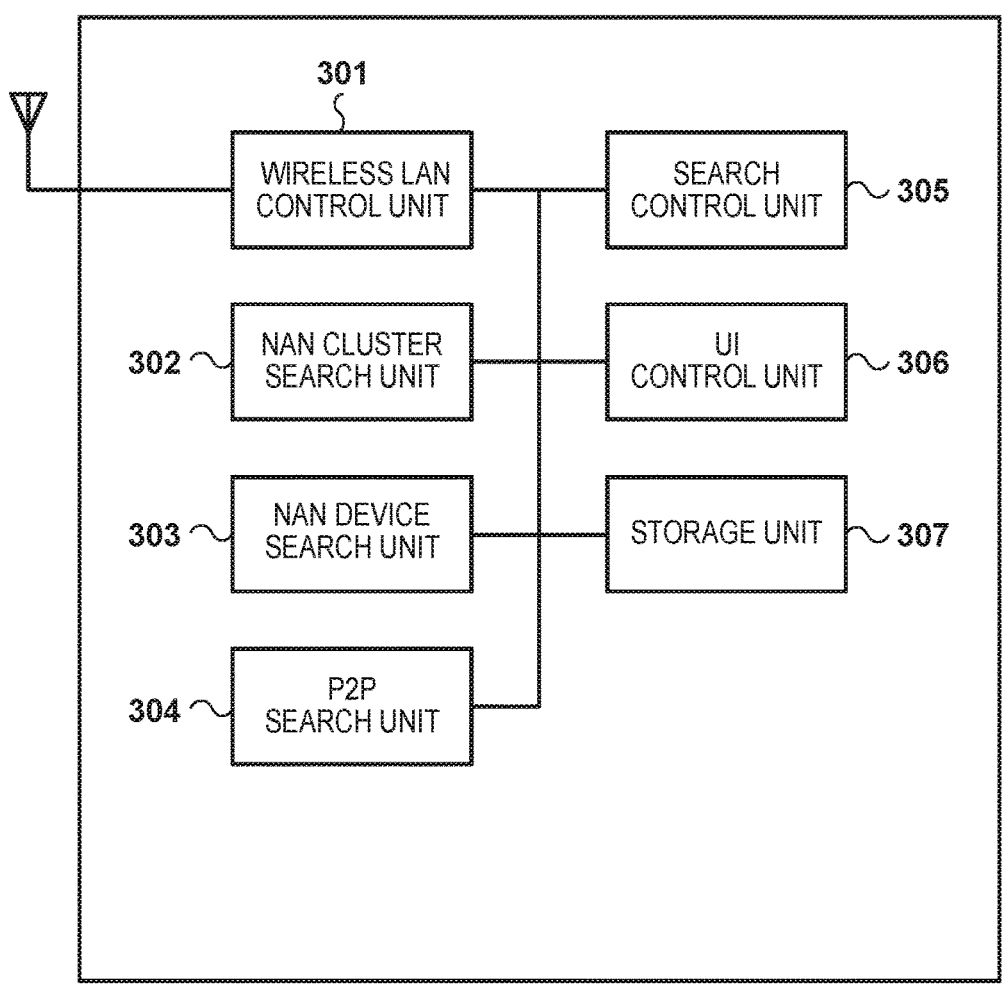

| | | |
|---|---|---|
| SEARCH START | NAN SEARCH START | P2P SEARCH START |

| DEVICE NAME | CONNECTION FORM | SEARCH METHOD |
|---|---|---|
| | | |

| | | |
|---|---|---|
| SEARCH START | NAN SEARCH START | P2P SEARCH START |

| DEVICE NAME | CONNECTION FORM | SEARCH METHOD |
|---|---|---|
| NAN 102 | Infra | NAN |
| NAN 103 | IBSS | NAN |

| | | |
|---|---|---|
| SEARCH START | NAN SEARCH START | P2P SEARCH START |

| DEVICE NAME | CONNECTION FORM | SEARCH METHOD |
|---|---|---|
| NAN 102 | Infra | NAN |
| NAN 103 | IBSS | NAN |
| P2P 107 | P2P GO | P2P |
| P2P 106 | P2P | P2P |
| P2P 105 | P2P | P2P |

COMMUNICATION APPARATUS, CONTROL METHOD, AND NON-TRANSITORY COMPUTER-READABLE STORAGE MEDIUM

BACKGROUND OF THE INVENTION

Field of the Invention

The present invention relates to a technique of recognizing another communication apparatus by a communication apparatus.

Description of the Related Art

A wireless communication system using a wireless LAN represented by the IEEE802.11 standard has been widely used. In the wireless LAN, a base station called an access point (to be referred to as an "AP" hereinafter) often controls a wireless network. A wireless network is formed by the AP and stations (to be referred to as "STAs" hereinafter) which fall within the radio wave coverage of the AP and are in a wirelessly connected state.

In recent years, products and standards for various network forms of the wireless LAN have appeared on the market, in addition to this conventional simple wireless network configuration of the AP and STAs. In Wi-Fi Direct, one of the communication apparatuses that are communicating becomes a P2P group owner (to be referred to as a "GO" herein after) which operates as a base station like the AP. The other communication apparatus becomes a P2P client (to be referred to as a "client" hereinafter) which operates as a terminal station like the STA. Wireless communication is established between the GO and the client, and communication is performed.

Wi-Fi Direct services are available as a standard obtained by extending Wi-Fi Direct. In Wi-Fi Direct services, a communication apparatus exchanges, with another communication apparatus, information about supported services before establishing wireless connection. As a result, the communication apparatus can learn in advance about the types of services that are provided and can be used. Services in this case can include, for example, a print service, a file transmission/reception service, transmission/playback of various kinds of media data such as an image or a video, a screen streaming service, and the like. In addition, an original service provided by a vendor can also be defined.

On the other hand, Wi-Fi® NAN (Neighbor Awareness Networking) standard is a standard for discovering a communication apparatus and a service provided by it with low power consumption. In NAN, the communication apparatus synchronizes an information exchange period with the other communication apparatus to shorten the time necessary to enable the wireless RF related to the information exchange. Hence, the communication apparatus can exchange, with low power consumption, the service information with the other apparatus (see U.S. Patent Application Publication No. 2015/0036540).

Different service discovery mechanisms are used for Wi-Fi Direct services and Wi-Fi NAN, and only a communication apparatus that complies with one of the standards can be discovered. Hence, if a communication apparatus and a service provided by it are searched using Wi-Fi Direct services, only a communication apparatus complying with the Wi-Fi Direct services can be discovered. On the other hand, if a communication apparatus and a service provided by it are searched using Wi-Fi NAN, only a communication apparatus complying with the Wi-Fi NAN can be discovered. On the other hand, in some cases, a user may not want to search for a communication apparatus that complies with a predetermined standard, but may simply want to discover a communication apparatus that provides a predetermined service. Hence, in some cases, user convenience could not be satisfied by performing separate searches using the respective conventional standards.

The present invention provides a technique capable of discovering another communication apparatus which complies with one of a plurality of standards by a single user operation.

SUMMARY OF THE INVENTION

According to one aspect of the present invention, there is provided a communication apparatus comprising: a first search unit configured to search, in one channel, another communication apparatus by a first method complying with Wi-Fi Alliance Neighbor Awareness Networking; a second search unit configured to search, over a plurality of channels, the other communication apparatus by a second method which is different from the first method; an accepting unit configured to accept a search instruction of the other communication apparatus; and a control unit configured to control, in response to accepting the one instruction by the accepting unit, the first search unit and the second search unit so as to execute a search by the first method and a search by the second method.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a block diagram showing an example of the functional arrangement of the STA 101;

FIG. 6 is a view showing an example of a screen displayed on an UI of the STA 101 at the start of the search processing;

FIG. 7 is a view showing an example of a screen displayed on the UI of the STA 101 after NAN search processing;

FIG. 8 is a view showing an example of a screen displayed on the UI of the STA 101 after P2P search processing;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

An example using a wireless LAN system complying with the IEEE802.11 standard will be described below. However, the present invention is not limited to this. That is, the following discussion is applicable to a wireless communication system (and a wireless communication apparatus included in the system) that performs the same device and service discovery processing as those to be described below.

Wireless Communication System

Figure 1:
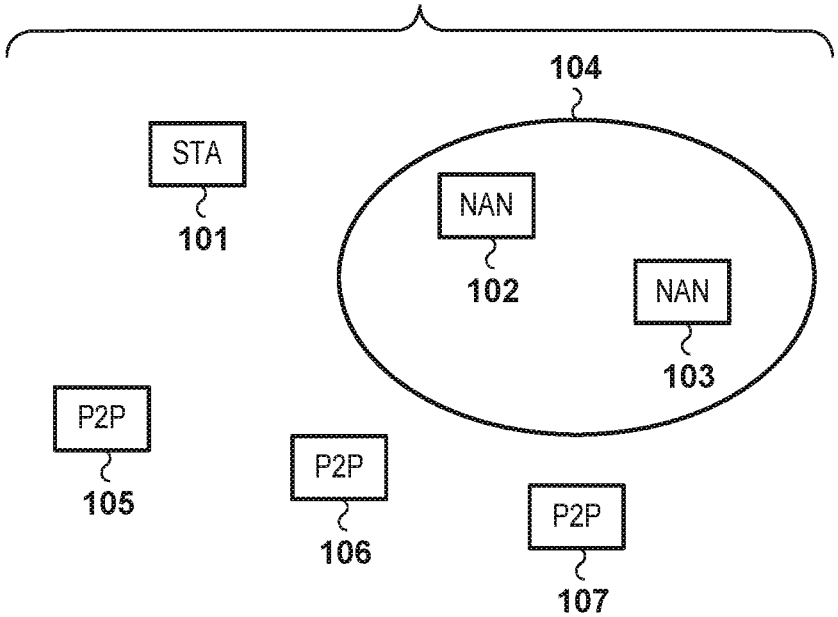
FIG. 1 is a view showing an example of the configuration of a wireless communication system.

FIG. 1 shows an example of the configuration of a wireless communication system (example of the configuration of a wireless network) according to the following embodiments. The wireless communication system is formed by including a wireless communication apparatus provided with a plurality of wireless LAN functions. Note that the wireless communication apparatus here includes, for example, an STA 101, a NAN 102, a NAN 103, a P2P 105, a P2P 106, and a P2P 107. Here, although not shown in FIG. 1, a wireless LAN access point (AP) or the like can be included in the wireless communication system.

The STA 101 is a communication apparatus that executes the processes to be described below and can execute device and service discovery processing by Wi-Fi Direct services and the Wi-Fi NAN standard. Wi-Fi Alliance Neighbor Awareness Networking is to be referred to as a NAN or Wi-Fi NAN hereinafter. Additionally, a search by Wi-Fi Direct services will be called "a search by P2P". The STA 101 includes functions to search, based on Wi-Fi Direct services and Wi-Fi NAN, for nearby communication apparatuses and services provided by the apparatuses and display the search result to a user.

The NAN 102 and the NAN 103 are communication apparatuses capable of executing the device and service discovery processing by the Wi-Fi NAN standard and have joined a NAN cluster 104. Here, the NAN 102 operates in a master role of the NAN cluster 104, and the NAN 103 joins the NAN cluster 104 in a non-master non-sync role. The NAN cluster 104 is the NAN cluster that the NAN 102 and the NAN 103 have joined. The NAN devices that have joined the NAN cluster 104 create a network using channel 6. Here, in the NAN cluster 104, a DW (Discovery Window) has a period of 16 TUs which arrives at a cycle of 512 TUs. That is, the period from the DW to the start of next DW is 512 TUs. Note that the DW is a predetermined period which arrives at a predetermined cycle, and the period can be of a length other than 16 TUs that arrives at a cycle other than the cycle of 512 TUs.

Note that, in order to use a service provided by the NAN 102, a communication apparatus needs to connect to an AP (not shown) to which the NAN 102 is connected and communicate with the NAN 102 via this AP. In this case, the NAN 102 will always transmit a publish message, which is a message to notify the communication apparatus that a service is being provided, by imparting information which indicates that connection to NAN 102 via the AP is necessary. For example, the NAN 102 transmits, in a connection capability bitmap, a message in which the WLAN infrastructure as a NAN connection capability attribute is enabled. Note that the NAN connection capability attribute or the like is an information element, defined by the NAN standard, in the message.

On the other hand, in order to use a service provided by the NAN 103, the communication apparatus needs to join an IBBS (not shown) and communicate with the NAN 103. In this case, the NAN 103 transmits a publish message, giving information which indicates a necessity for the communication apparatus to join the IBBS and communicate with the NAN 103. For example, the NAN 103 transmits a message in which the IBBS as the NAN connection capability attribute is enabled in the connection capability bitmap.

The P2P 105, the P2P 106, and the P2P 107 are communication apparatuses each capable of executing the device and service discovery processing by the Wi-Fi Direct services standard. Assume that, for example, the P2P 107 operates as a P2P group owner (GO). Assume also that the P2P 105 and the P2P 106 have not created a P2P network and are not operating as the GO or a P2P client (CL). Assume that the P2P 105 and the P2P 106 are repeating a search state or a listen state (to be described later).

Arrangement of STA 101

Examples of the hardware arrangement and the functional arrangement of the STA 101 which executes the following processes will be described next with reference to FIGS. 2 and 3.

Figure 2:
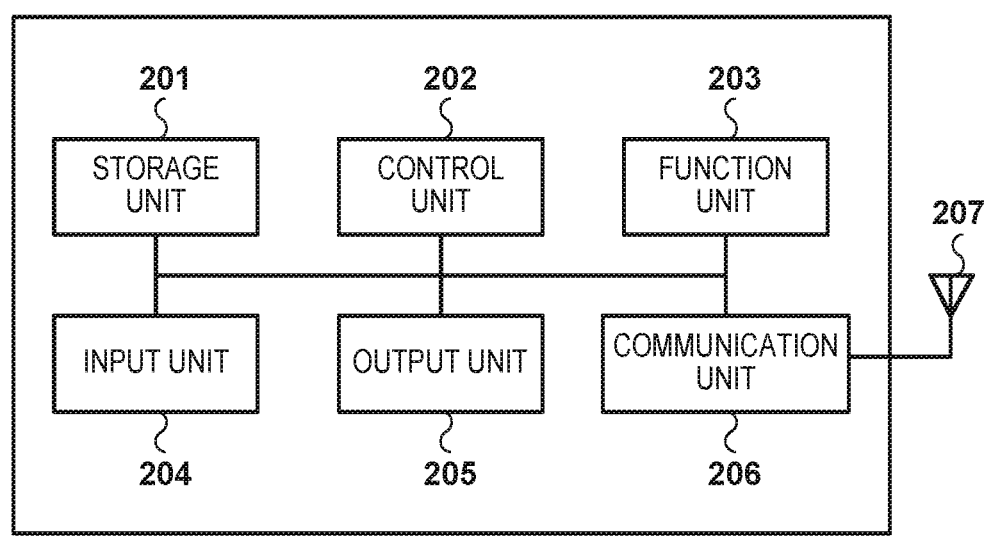
FIG. 2 is a block diagram showing an example of the hardware arrangement of an STA 101.

FIG. 2 shows the hardware arrangement of the STA 101 according to this embodiment. The STA 101 includes, as an example of the hardware arrangement, a storage unit 201, a control unit 202, a function unit 203, an input unit 204, an output unit 205, a communication unit 206, and an antenna 207.

The storage unit 201 is formed by one or both of a ROM and a RAM and stores programs for executing various operations (to be described later), and various kinds of information such as communication parameters for wireless communication. Note that instead of the memory such as the ROM or RAM, a storage medium such as a flexible disk, hard disk, optical disk, magnetooptical disk, CD-ROM, CD-R, magnetic tape, nonvolatile memory card, or DVD may be used as the storage unit 201.

A control unit 202 is formed by a CPU or MPU, and controls the overall STA 101 by executing the programs stored in the storage unit 201. Note that the control unit 202 may control the overall STA 101 in cooperation with an OS (Operating System) and the programs stored in the storage unit 201.

The control unit 202 controls the function unit 203 to execute predetermined processing such as image capturing, printing, and projection. The function unit 203 is hardware used by the STA 101 to execute predetermined processing. If, for example, the STA 101 is a camera, the function unit 203 serves as an image capturing unit, and performs image capturing processing. If, for example, the STA 101 is a printer, the function unit 203 serves as a printing unit and performs print processing. If, for example, the STA 101 is a projector, the function unit 203 serves as a projection unit and performs projection processing. Data processed by the function unit 203 may be data stored in the storage unit 201 or data communicated with another STA via the communication unit 206 (to be described later).

The input unit 204 accepts various operations from the user. The output unit 205 performs various kinds of output operations to the user. The output from the output unit 205 includes at least one of display on a screen, a voice output from a loudspeaker, a vibration output, and the like. Note that both of the input unit 204 and the output unit 205 may be implemented by one module like a touch panel.

The communication unit 206 controls wireless communication complying with the IEEE802.11 standard series and controls IP communication. The communication unit 206 controls the antenna 207 to transmit/receive a wireless signal for wireless communication. The STA 101 communicates content such as image data, document data, or video data with another communication apparatus via the communication unit 206.

FIG. 3 is a block diagram showing an example of the functional arrangement of the STA 101. The STA 101 includes, as the functional arrangement, for example, a wireless LAN control unit 301, a NAN cluster search unit 302, a NAN device search unit 303, a P2P search unit 304, a search control unit 305, a UI control unit 306, and a storage unit 307.

The wireless LAN control unit 301 is formed by including an antenna, a circuit, and a program for controlling the antenna and circuit for transmitting/receiving a wireless signal to/from another communication apparatus provided with a wireless LAN communication function. The wireless LAN control unit 301 can execute device and service discovery processing by the Wi-Fi Direct services and Wi-Fi NAN.

The NAN cluster search unit 302 is a control unit to search for a NAN cluster. The NAN cluster search unit 302 can discover a NAN cluster existing nearby by receiving a discovery beacon via the wireless LAN control unit 301. Here, a NAN information element (IE) is given to the discovery beacon. By receiving the NAN-IE given beacon, the NAN cluster search unit 302 can identify the received beacon as a beacon related to the NAN cluster.

The NAN device search unit 303 is a control unit to search for a NAN device existing in the NAN cluster which the STA 101 has joined. The NAN device search unit 303 discovers, for example, a NAN device in the NAN cluster by executing transmission of a publish message, reception of a subscribe message, and the like via the wireless LAN control unit 301. The messages related to NAN service discovery such as the publish message and the subscribe message are transmitted/received in a format called a NAN service device frame (SDF). In addition, the messages are formed by including attribute information related to NAN (NAN attributes).

The P2P search unit 304 is a control unit to search for a P2P device and to execute device discovery defined by Wi-Fi Direct services. The P2P search unit 304 discovers a P2P device, for example, by transmitting a probe request (search request) complying with Wi-Fi Direct and receiving a response (search response) from the P2P device via the wireless LAN control unit 301. At this time, a prefix "DIRECT-" as an SSID and a P2P information element (P2P IE) including information such as the capability of the P2P device are given to the probe request.

The search control unit 305 is formed by including hardware and a program to discover each communication apparatus complying with Wi-Fi Direct services or Wi-Fi NAN by controlling the NAN device search unit 303 and the P2P search unit 304. In addition, the search control unit 305 also includes hardware and a program to list up the discovered communication apparatuses and further execute control to cause the UI control unit 306 to display the result. Details of the processing executed by the search control unit 305 will be described later.

The UI control unit 306 is formed by including hardware and a program for controlling the hardware related to user interfaces such as a touch panel and a button to accept operation of STA 101 by the user (not shown) of the STA 101. In addition, the UI control unit 306 includes an interface to present information to the user by, for example, an image or sound. The storage unit 307 is formed by including a ROM and a RAM that store programs and data operated by the STA 101.

Processing Procedure

Some embodiments of processing executed by the STA 101 including the aforementioned arrangements will be described next.

First Embodiment

Figure 4:
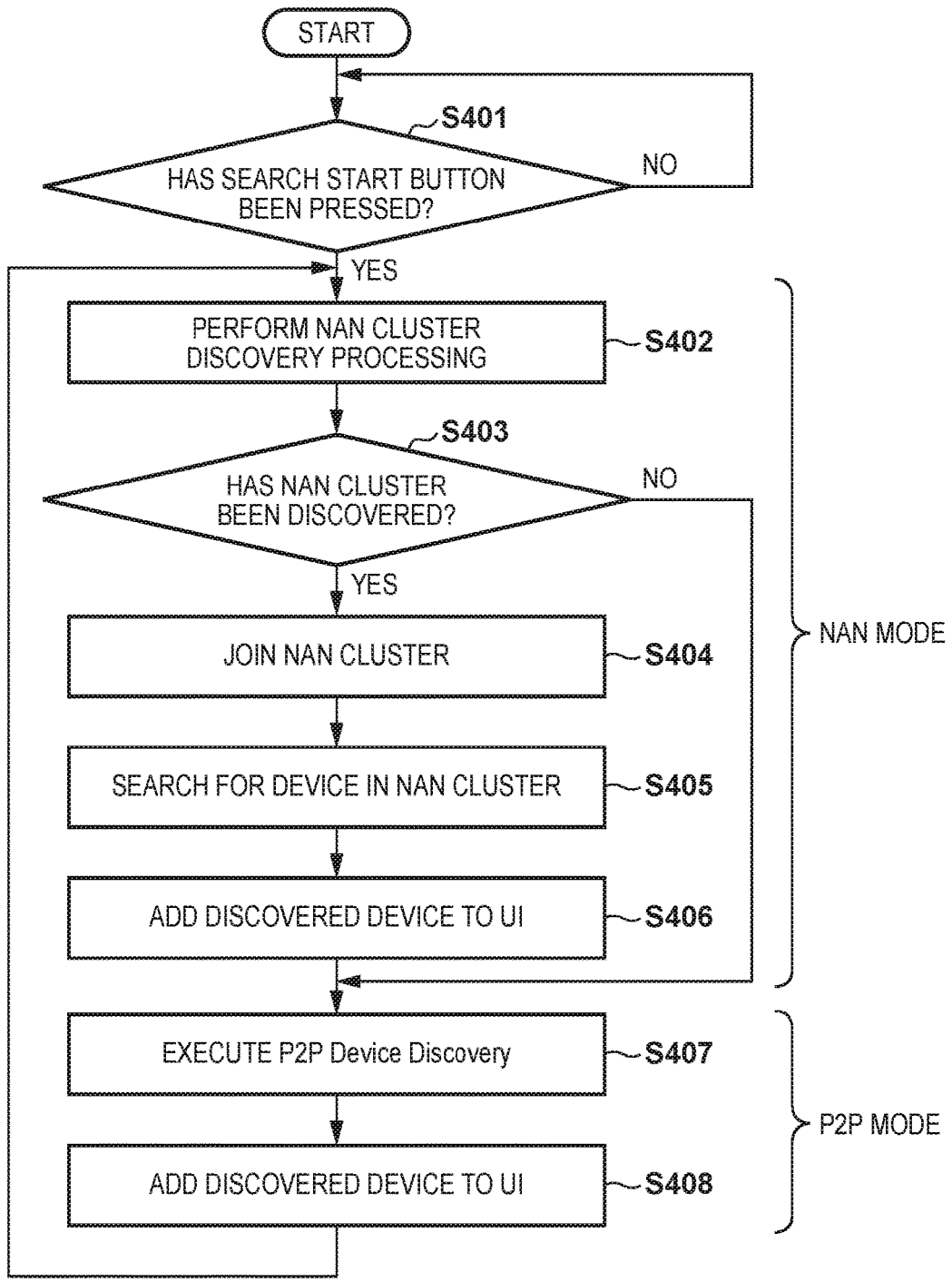
FIG. 4 is a flowchart illustrating the first example of the procedure of search processing for a service providing communication apparatus.

FIG. 4 is a flowchart illustrating an example of the procedure of processing in which the STA 101 searches for the service providing communication apparatus according to the first embodiment. The search control unit 305 executes this processing by controlling the NAN cluster search unit 302, the NAN device search unit 303, and the P2P search unit 304.

The STA 101 first confirms whether a search start instruction has been accepted from the user via the UI control unit 306 (step S401). If there is no instruction from the user (NO in step S401), the STA 101 waits until it accepts an instruction from the user, and upon accepting the search instruction from the user (YES in step S401), searches for a NAN cluster (step S402) by the NAN cluster search unit 302. In step S402, the STA 101 waits, for example, to receive a discovery beacon for a predetermined period.

The STA 101 determines whether a NAN cluster has been discovered (step S403). If a NAN cluster has been discovered (YES in step S403), the STA 101 joins this NAN cluster (step S404). At this time, if a plurality of NAN clusters are discovered, the STA 101 can join, for example, a NAN cluster that has the largest cluster grade (CG) included in the discovery beacon in accordance with the Wi-Fi NAN standard. Upon joining the NAN cluster, the STA 101 next searches for a NAN device in the NAN cluster it has joined (step S405). Here, the STA 101 transmits, for example, a service discovery frame (SDF) subscribe message according to the Wi-Fi NAN standard. Note that the subscribe message is a message to search for a service providing NAN device. Upon receiving the subscribe message, the service providing NAN device transmits an SDF publish message as a response. As a result, the STA 101 can discover the service providing NAN device. After the search for the NAN device has been executed for a predetermined period, the STA 101 causes the UI control unit 306 to display the search result to notify the user of the discovered device (step S406).

Then, the STA 101 executes P2P device discovery in accordance with the Wi-Fi Direct services to discover a communication apparatus complying with the Wi-Fi Direct services (step S407). Note that, if the STA 101 determines in step S403 that a NAN cluster has not been discovered (NO in step S403), it executes the P2P search (step S407), without executing the processes of the above-described steps S404 to S406. This process includes, for example, an all channel scan, a listen state, and a search state. Here, the listen state is a state of staying at a predetermined channel for a predetermined period and waiting for a search request from another communication apparatus. The search state is a state in which a probe request (search request) is sequentially transmitted to search for a communication apparatus waiting at a plurality of channels (for example, channel 1, channel 6, and channel 11). These processes will be described in detail later.

Subsequently, the STA 101 notifies the user of the communication apparatus discovered by the P2P device discovery and complying with the Wi-Fi Direct services by displaying the result on a UI in the same manner as in step S406 (step S408). After displaying the search result in step S408, the STA 101 repeats the processing from the NAN cluster discovery process again. Note that the STA 101 may end the search processing after executing the processes of steps S402 to S408 for a predetermined number of times.

Note that the search results displayed in step S406 and S408 can be results obtained by adding the information of a newly discovered communication apparatus to the previous search results. For example, the search result from step S407 can be added to the search result displayed in step S406 and displayed in step S408. In addition, the search result can be overwritten on some or all of the previous search results. For example, the search result displayed in step S406 is not overwritten by the search result in step S407 and can be overwritten by the result obtained by executing the executing the search in step S405 next time. In the same manner, a part of the search result of step S407 which is displayed in step S408 may not be overwritten by the search result in step S405 but may be overwritten by the search execution result in step S407 next time. That is, the NAN search result can be overwritten by a NAN search result of another opportunity, and the P2P device discovery search result can be overwritten by a P2P device discovery search result of another opportunity.

Figure 5:
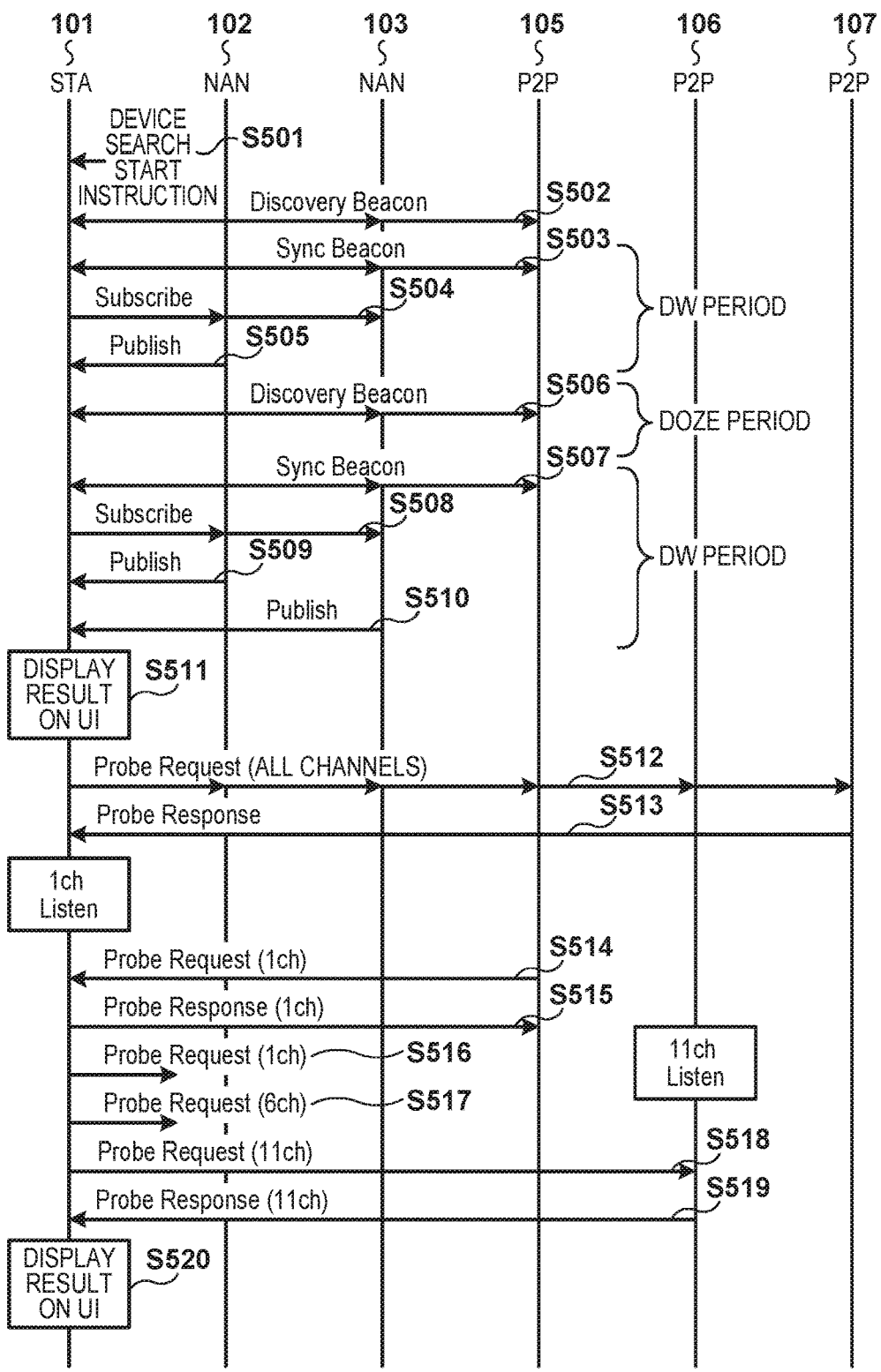
FIG. 5 is a sequence chart showing the first example of the procedure of the search processing for the service providing communication apparatus.

A sequence in which the STA 101 searches for the service providing communication apparatus will be described next with reference to FIG. 5. At this time, assume that communication apparatuses and a NAN cluster exist nearby the STA 101 as in FIG. 1.

First, the user (not shown) of the STA 101 operates the UI of the STA 101 to search for a device and instructs the start of device search processing (step S501). FIG. 6 shows an example of a screen 601 when the search is started. A "search start" button exists on the upper-left side of the screen 601, and the device search processing to be described below is started when this button is pressed. The screen 601 can also include a "NAN search start" button and a "P2P search start" button. Each of these buttons is a button that the user can use when searching solely for NAN devices or P2P devices. However, since it is more useful for most users to be able to search for a communication apparatus or a service without being conscious of the form of the wireless LAN such as the NAN or P2P, the "search start" button is prepared. Note that, at the start of the search, the device name and the connection form are not displayed on the screen 601 since no device has been discovered yet.

Upon detecting that the "search start" button has been pressed, the STA 101 first starts the NAN cluster search. This process corresponds to step S402 in FIG. 4. Here, since the NAN 102 is in a NAN master role, it periodically transmits a discovery beacon (step S502). The STA 101 can discover a NAN cluster by receiving this discovery beacon. Upon discovering a NAN cluster, the STA 101 joins this NAN cluster. In the subsequent description, assume that the STA 101 has joined the NAN cluster in a non-master non-sync role.

Upon joining the NAN cluster, the STA 101 receives a sync beacon from the NAN master during the DW (Discovery Window) period (step S503). The DW period is a period of a length of 16 TUs (=16×1024 μsec). Here, since the NAN 102 is in the NAN master role, the STA 101 receives the sync beacon transmitted from the NAN 102. Then, the STA 101 transmits a subscribe message to each member of the NAN cluster and searches for a service (step S504).

At this time, assume that the NAN 102 is synchronized during this DW period and the NAN 103 is not synchronized during this DW period. In this case, only the NAN 102 receives the subscribe message, and the NAN 103 does not receive the subscribe message since reception is turned off. Upon receiving the subscribe message, the NAN 102 notifies by a publish message the STA 101 of the service it provides (step S505).

The STA 101 enters a DOZE period when the DW period ends and reduces power consumption by not performing transmission/reception during the DOZE period. The DOZE period is a period after the DW period has ended and until the next DW period starts. The length of the DOZE period is 496 TUs (=496×1024 μsec). The NAN 102 periodically transmits, even outside the DW period, the discovery beacon so that NAN devices outside the NAN cluster can easily discover the NAN 102 (step S506).

Upon entering the next DW period, the NAN 102 transmits, in the same manner as in the previous DW period, the sync beacon (step S507). Then, the STA 101 transmits, in the same manner as in the previous DW period, a subscribe message to discover the service (step S508). In this DW period, assume that the NAN 102 and NAN 103 are both synchronized and have the reception turned on to receive the respective subscribe messages. In this case, in response to receiving the subscribe message, each of the NAN 102 and the NAN 103 notifies by the publish message the STA 101 of the service it provides (steps S509 and S510).

In this manner, a NAN device is searched in the NAN search processing by repeating the DW period and the DOZE period. In the DW period, communication apparatuses and services provided by these apparatuses are discovered by another communication apparatus through subscribe message transmission and publish message reception. Then, when the DW period ends, the STA 101 enters the DOZE period and stops the transmission/reception, thereby reducing the power consumption. These processes correspond to the process of step S405. Note that although a case in which the DW period is executed twice and the DOZE period is executed once is shown in FIG. 5, the respective numbers of executions are not limited to this. However, the DW period and the DOZE period are alternately repeated.

When the NAN search processing is finished, the STA 101 displays the result on the UI (step S511). FIG. 7 shows an example of a screen 701 that is displayed at this time. Since the NAN 102 and NAN 103 have been discovered up to this point, they are displayed on the screen 701. The connection form that is necessary for each device to use the service and the search method when each device is discovered are also displayed on the screen 701. As described above, since the NAN 102 has notified the STA 101 in the publish message that a WLAN infrastructure will be used to provide its service, "Infra" is displayed as the connection form corresponding to the NAN 102. On the other hand, as described above, since the NAN 103 has notified the STA 101 in the publish message that IBSS will be used to provide its service, "IBSS" is displayed as the connection form corresponding to the NAN 103. In addition, since each of the NAN 102 and the NAN 103 has been discovered by using the NAN, "NAN" is displayed as the search method corresponding to each of the NAN 102 and the NAN 103.

Upon completing the NAN search and displaying the search results, the STA 101 next executes the P2P search. This process corresponds to the process of step S407 in FIG. 4. In P2P search, the listen state and the search state are executed while being switched after all channels are scanned in the scan phase in accordance with the Wi-Fi Direct services standard. This allows the STA 101 to discover other communication apparatuses that comply with the Wi-Fi Direct services.

The STA 101 first transmits, to explicitly show to all channels that it is looking for a P2P device, probe requests (search requests) each of which is given a P2P IE (step S512). At this time, assume that the P2P 105 and the P2P 106 are in the search state defined by the P2P standard and do not respond to the respective probe requests transmitted in S512. On the other hand, the P2P 107 is operating as the GO and transmits a probe response (search response) including information of the service it provides, in addition to giving the P2P IE, to the probe request (step S513). The processes of S512 and S513 are called a scan phase.

Next, the STA 101 enters the listen state (steps S514 and S515). A listen-state communication apparatus stays and waits at a specific channel for a P2P search request transmitted from another communication apparatus and returns a search response when it receives a search request without transmitting a search request from itself. In this example, the STA 101 stays using channel 1 (1 ch). At this time, assume that the P2P 105, in the search state, broadcasts a probe request to channel 1 (step S514). Upon receiving the probe request, the STA 101 transmits a probe response as the response (step S515). Since the STA 101 can also recognize the existence of the P2P 105 by receiving the probe request, it adds the P2P 105 to the search results.

Upon completing the listen state, the STA 101 subsequently enters the search state (steps S516 to S519). In the search state, the STA 101 sequentially transmits a probe request to channel 1, channel 6, and channel 11 (steps S516, S517, and S518). At this time, after transmitting the probe requests, the STA 101 stays at the channels to which the respective probe requests have been transmitted for a predetermined time and waits for a probe response from another communication apparatus. Here, in this example, assume that the P2P 106, in the listen state, is waiting for the search request using channel 11. The P2P 106 accordingly receives the probe request using channel 11 and transmits a probe response as the response to the STA 101 (step S519). By receiving the probe response from the P2P 106, the STA 101 can recognize the existence of the P2P 106 and obtain the service information from the P2P IE information included in the probe response. Subsequently, the STA 101 adds the P2P 106 to the search results.

Note that in one execution of P2P search processing (step S407), the above-described scan phase, listen state, and search state may be repetitively executed, but each of the phases and states is executed once in this example.

Upon completing the P2P search processing, the STA 101 adds the P2P search result on the result obtained in S511 and displays the added result on the UI (step S520). FIG. 8 shows an example of a screen 801 displayed on the UI at this time. The screen 801 is obtained by adding, to the screen 701 in FIG. 7, the P2P 105, the P2P 106, and the P2P 107 as the P2P devices discovered by the P2P search. At this time, since the P2P 107 is operating as the GO, in order to distinguish the P2P 107 from the other P2P devices not operating as the GO or the CL, "P2P GO" is displayed as the connection form corresponding to the P2P 107. On the other hand, "P2P" is displayed as the corresponding connection form for the P2P 105 and the P2P 106 as the other P2P devices. In this manner, by presenting, to the user, the connection form when the service is to be used, the user can select a device of a connection form which he/she has specified.

Since the P2P 105, the P2P 106, and the P2P 107 have been discovered by the P2P search, "P2P" is displayed as the search method corresponding to each device. This allows the user to know whether each discovered communication apparatus is a communication apparatus discovered by NAN or a communication apparatus discovered by P2P. For example, if the user frequently uses the service of NAN 102, the user can accordingly know that the NAN 102 can be discovered by the NAN search. If the user knows in advance that the NAN 102 will be used, rather than using the search start button to execute both NAN and P2P searches, the user can use the NAN search start button. Since the frequency of the DOZE period becomes higher from executing only the NAN search, the power consumption of the STA 101 can be reduced. Additionally, if the communication apparatus which provides a service frequently used by the user can be discovered by the P2P search, the user can omit the NAN search by pressing the P2P search start button to execute only the P2P search. As a result, the STA 101 can quickly discover the P2P device.

In this embodiment, the STA 101 executes the NAN search over a period of two DWs, and the scan phase, the listen state, and the search state are each executed once in the P2P search. However, the present invention is not limited to this. That is, the NAN search and the P2P search can be executed at various timings and periods. At this time, the NAN search time and the P2P search time may not be set to a fixed time, but may be set to a variable time. Hence, if two similarly operating communication apparatuses exist, while one apparatus executes the NAN search, the other apparatus can execute the P2P search or while one apparatus executes the P2P search, the other can execute the NAN search, thereby preventing the communication apparatus from not being able to discover each other.

In addition, in this embodiment, although the NAN search is executed before the P2P search, the P2P search may be executed first. For example, a search method with a higher possibility of discovering the communication apparatus which provides the service frequently used by the user can be set to be executed first. In this case, the user can obtain the desired result earlier.

Furthermore, in this embodiment, the NAN cluster search processing is executed again after the P2P search. However, such processing need not always be performed. For example, if there is an already discovered NAN cluster, the STA 101 may join the already discovered NAN cluster (step S404) without executing the NAN cluster search processing (steps S402 and S403). Hence, for example, if the situation of the nearby communication apparatuses does not largely change and the NAN cluster that can be joined does not substantially change, a NAN device search can be quickly started in the NAN cluster.

According to this embodiment, both kinds of communication apparatuses, that is, NAN devices and P2P devices can be searched together at once by a single pressing operation of the search start button by the user. In this manner, at the time of the device search, since the user need not start the P2P search and the NAN search separately, user convenience is improved.

Information related to the discovered communication apparatus may be added to the screen of the UI after the NAN search or the P2P search processing ends or each time a device is discovered. As a result, the period until the discovery of the device to the notification of the existence of the device to the user is shortened, thereby further improving user convenience.

In this embodiment, since the NAN search processing and the P2P search processing are alternately executed, the search for a device and a corresponding service can be executed in the same framework as an existing NAN search and an existing P2P search. Hence, the embodiment is advantageous in that it facilitates control.

Second Embodiment

Figure 9:
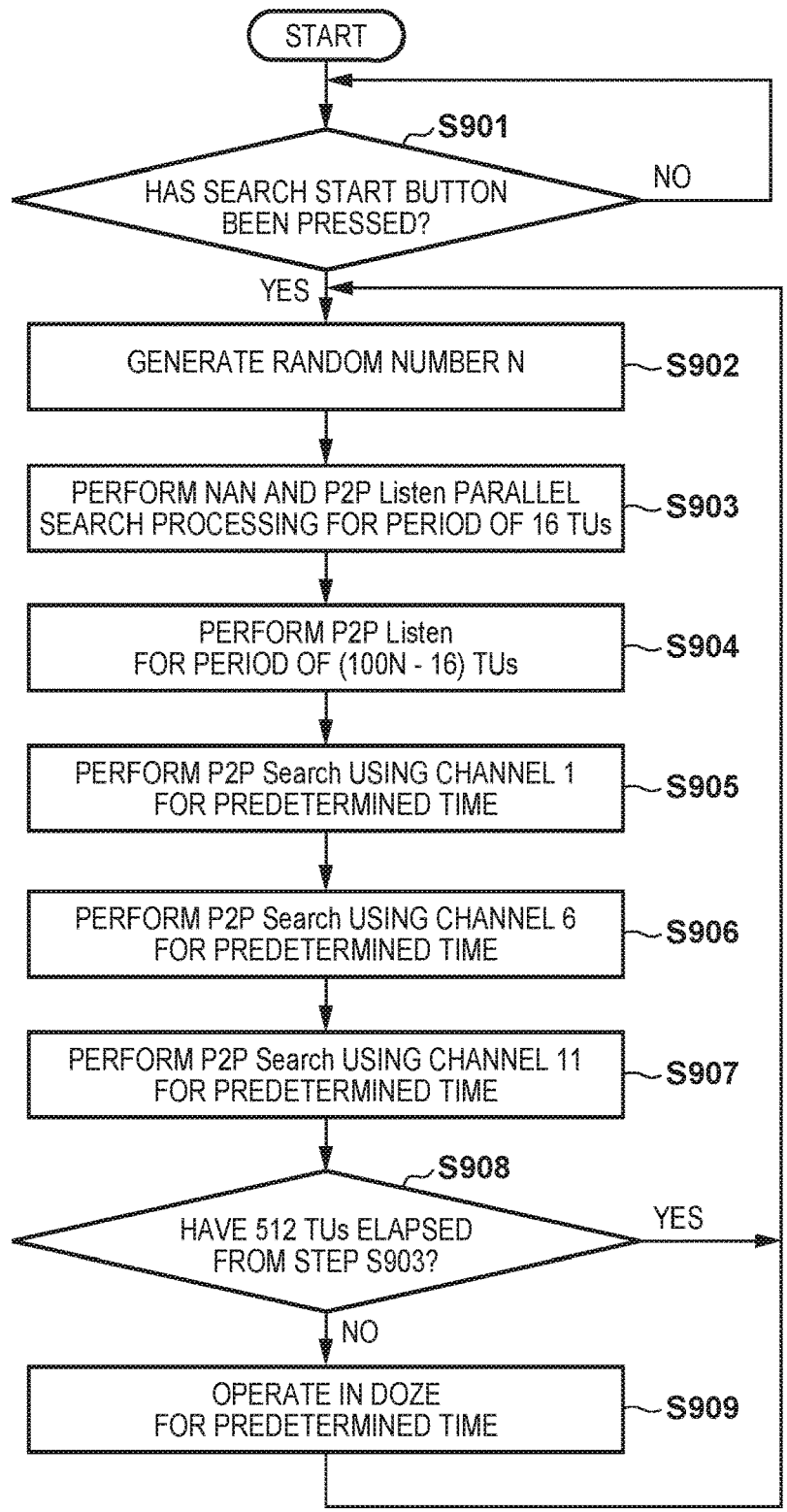
FIG. 9 is a flowchart illustrating the second example of the procedure of search processing for a service providing communication apparatus.

In this embodiment, at the same time as a P2P listen state, NAN device search processing in a DW period of a NAN is executed. The processing that is to be executed in this embodiment will be described with reference to FIG. 9. In the description of this embodiment, assume that a NAN cluster to be joined has already been discovered.

Step S901 is the same as step S401. Upon starting a search, an STA 101 subsequently generates a random number N (step S902). This is a random number to determine the time of the P2P listen state. The period of the listen state is the length of (100 TUs×a random number value) in accordance with the Wi-Fi Direct services standard. For example, if N=2, the STA 101 sets the length of the next listen state period as 200 TUs. Note that since a recommended value of 1 to 3 has been designated for the range of the random number value, assume that a value of 1 to 3 has been designated as the random number.

When the random number is decided, the NAN search and the P2P listen state are executed in parallel by the STA 101 (step S903). At this time, assume that the STA 101 uses channel 6 for the NAN search, and along with this, assume that the channel of the listen state is also set to channel 6 to match the channel used in the NAN search. The STA 101 executes the NAN search, for example, by transmitting a subscribe message and waiting to receive a publish message. At the same time, the STA 101 waits to receive a probe request transmitted from another P2P device. If the STA 101 receives a probe request, the STA 101 displays, as the search result, the information of the transmission source communication apparatus on an UI to notify the user. If the STA 101 receives the probe request, the STA 101 transmits a probe response as a response to the request. Information can be displayed on the UI in the same manner as in the first embodiment. Note that the STA 101 starts the process in step S903 when the NAN cluster that it has joined changes to a DW period. In addition, the period in which the process is to be executed has 16 TUs in the same manner as the DW period.

After executing the parallel search processing for a period of 16 TUs, the STA 101 operates in a normal listen state (step S904). Since the listen state is over a period of 100×N, the length of the period in which the STA 101 operates in the listen state alone is 100×N−16 TUs. The STA 101 also displays the P2P devices discovered during this period on the UI to notify the user of the P2P devices.

Upon completing the listen state, the STA 101 subsequently changes to a search state and searches for P2P devices using channel 1, channel 6, and channel 11 (steps S905, S906, and S907). Here, as the search time of each channel, the shorter time out of 100 TUs and (512−100×N)/3 TUs is set. For example, if N=1, (512−100×1)/3= 137.33 . . . TUs, 100 TUs are set as the search time for each channel. If N=2, (512−100×2)/3=104 TUs, 100 TUs is set as the search time for each channel. On the other hand, if N=3, (512−100×3)/3=70.666 . . . TUs, 71 TUs or 70 TUs are set as the search time for each channel. Here, if N=3, 512−100× 3=212 UT, the length of the search period of each channel is decided so that the total search time of the three channels becomes 212 TUs.

In the search state, the STA 101 transmits, as described in the first embodiment, a probe request in each channel and waits for a probe response. Then, if a probe response is received from a P2P device, the STA 101 displays the information of this P2P device as the search result on the UI to notify the user. Note that the STA 101 may continue to wait for a probe response for a predetermined period after transmitting the probe request once or wait for a probe response while transmitting the probe request a plurality of times. In either case, the STA 101 executes the search state process for only the aforementioned search period for each channel.

Upon completing the search state, the STA 101 determines whether 512 TUs have elapsed from the start of the process in step S903 (step S908). If 512 TUs have not elapsed from the start of the process in step S903 (NO in step S908), the STA 101 turns off the transmission/reception in a DOZE state for the period until the next DW and waits (step S909). On the other hand, if 512 TUs have elapsed from the start of the process in step S903 (YES in step S908), the STA 101 returns the process to step S902. For example, if N=3, since 512 TUs will have elapsed at the point of time of step S908, the process is returned to step S902. On the other hand, if N=1 or N=2, since 512 TUs have not elapsed, the STA 101 waits for the time until the next DW. Note that if N=1, the STA 101 waits for 112 TUs, and if N=2, the STA 101 waits for 12 TUs. Note that if the length of the necessary wait period can be specified at the point when the random number N is determined, the STA 101 need not execute the determination in step S908 and can wait for the length of the specified period in the DOZE state after the process of step S907 ends. For example, if N=1 in the aforementioned example, after the end of the process in step S907, the determination in step S908 need not be executed, and the STA 101 can wait in the DOZE state for 112 TUs. That is, the determination in step S908 is not required to be executed as a process.

Figure 10:
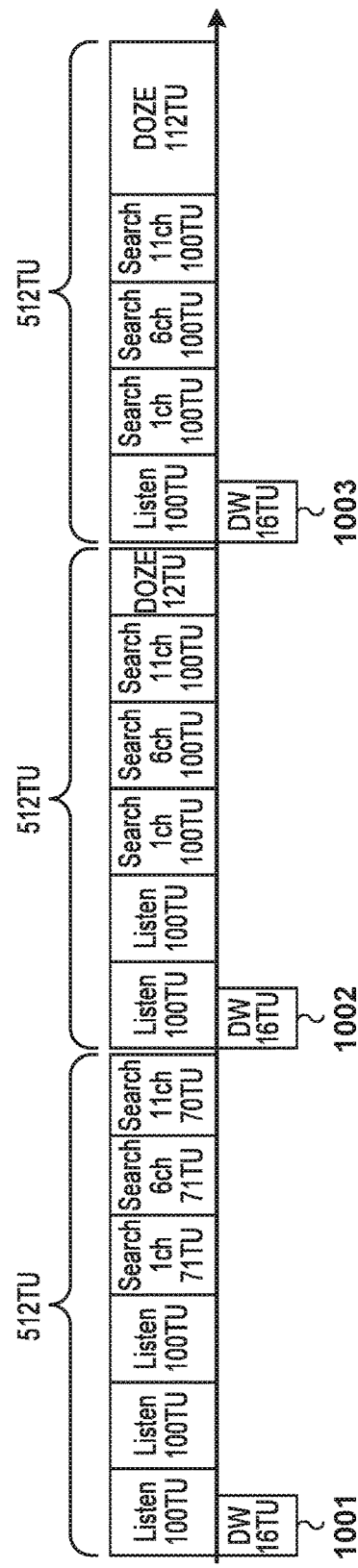
FIG. 10 is a view showing an overview of a case in which the second example of the search processing has been executed.

FIG. 10 is a view showing an image of the search processing when the random number N changes in the order of N=3, N=2, and N=1. A period of 512 TUs including a period 1001 shows an example of the case in which N=3. In this case, the P2P listen state and wait for the NAN DW period are executed in parallel for 16 TUs, and the search in the listen state is subsequently executed for 300−16=284 TUs. Subsequently, the search state is executed, in the order of channel 1, channel 6, and channel 11 for the periods of 71 TUs, 71 TUs, and 70 TUs, respectively.

A period of 512 TUs including a period 1002 shows an example of the case in which N=2. In this case, the total time of the listen state and the search state becomes 500 TUs, and the period of 12 TUs which is a period of the difference between 512 TUs and 500 TUs is set to the DOZE state, and the transmission/reception of the STA 101 is turned off. A period of 512 TUs including a period 1003 shows an example of the case in which N=1.

Figure 11:
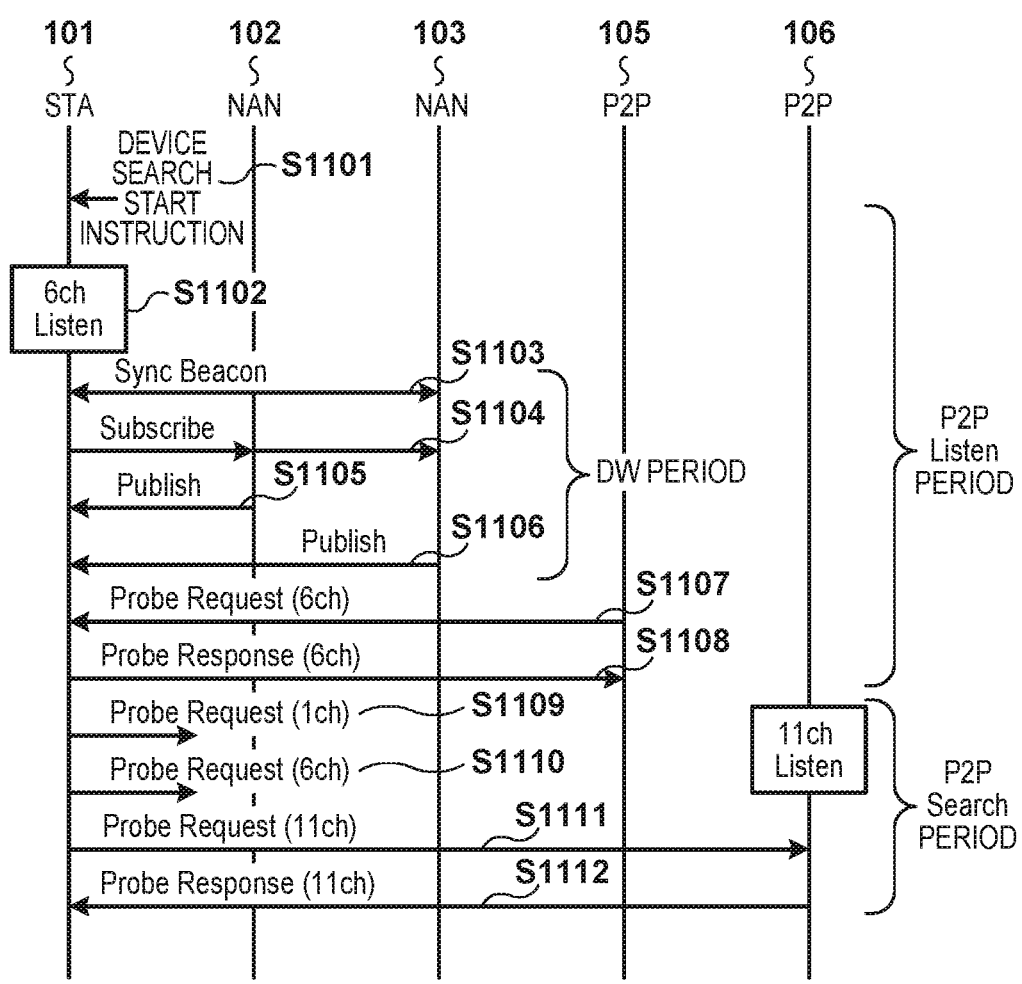
FIG. 11 is a sequence chart showing the second example of the procedure of the search processing for the service providing communication apparatus.

A sequence when the STA 101 according to this embodiment searches for a service providing communication apparatus will be described next with reference to FIG. 11. Assume that, in the same manner as in the description of the first embodiment, communication apparatuses and a NAN cluster exist near the STA 101 as in FIG. 1. Here, however, for the sake of descriptive convenience, a description of a P2P 107 is omitted. Note that although signals transmitted/received in FIG. 11 are the same as those in the first embodiment, the process is different in that the period of the P2P listen state from S1102 to S1108 and the NAN DW period from S1103 to S1106 are executed overlapping each other. Since the DW period is 16 TUs, the search in the NAN DW period is stopped after 16 TUs have elapsed, and the P2P listen state is continued. Subsequently, the P2P search of the P2P search state continues to be executed. Note that although it is omitted in FIG. 11, the DOZE period is generated depending on the value of the random number N, and power consumption of the STA 101 is reduced. Additionally, the processes from S1102 to S1112 can be repetitively executed. At this time, the timings of the DW period and the P2P listening state using channel 6 can be easily matched by setting the cycle from steps S903 to S909 (step S908 in some cases) to be 512 TUs.

In this embodiment, by partially executing the NAN search and the P2P search, efficiency of the search processing is increased. That is, in a case in which the NAN search and the P2P search are alternately executed, P2P devices cannot be discovered while the NAN search is executed, and NAN devices cannot be discovered while the P2P search is executed. In contrast, in this embodiment, NAN devices and P2P devices can be discovered simultaneously. On the other hand, since the P2P search is repetitively executed, the power-saving effect is reduced compared to the first embodiment. Hence, the STA 101 does not always execute the P2P search, but executes, for example, the P2P search processing in parallel during one DW period out of the three DW periods. The STA 101 does not execute the P2P search for two remaining DW periods and may enter the DOZE state. As a result, the power consumption of the STA 101 can be reduced.

Third Embodiment

Figure 12:
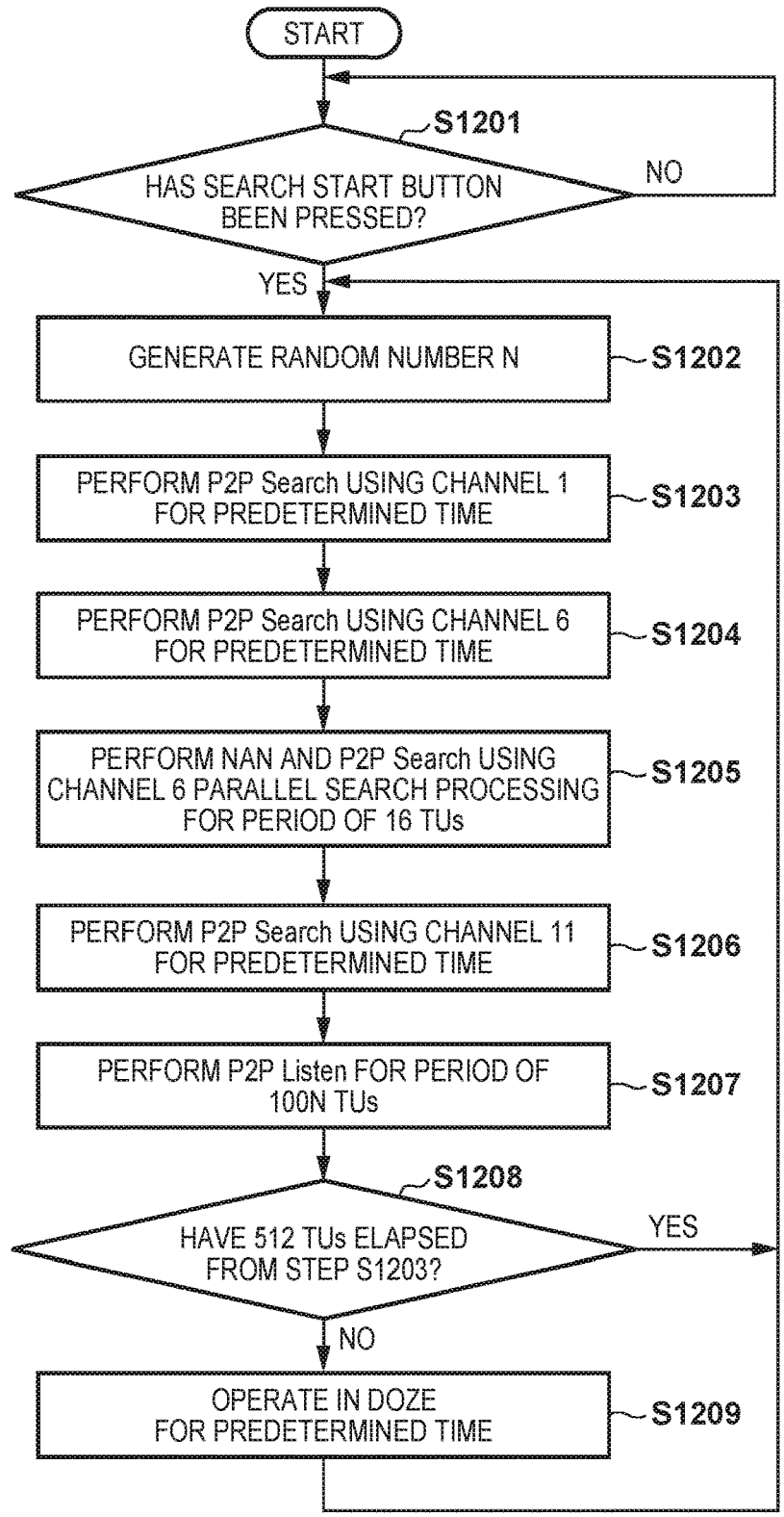
FIG. 12 is a flowchart illustrating the third example of the procedure of search processing of a service providing communication apparatus.

In this embodiment, NAN device search processing in a NAN DW period is executed in parallel with a P2P search state. The sequence of processing according to this embodiment will be described with reference to FIG. 12. In the description of this embodiment, assume that a NAN cluster to be joined has already been discovered.

The process of step S1201 is the same as that in step S401, and a description thereof will be omitted. An STA 101 subsequently generates a random number N (step S1202) in the same manner as in step S902. The STA 101 next executes a search in a P2P search state (steps S1203 to S1206). The length of the period at this time is the same as that in the second embodiment, and for example, if N=1 or N=2, the search period length of the search state for each channel is 100 TUs. In addition, if N=3, the search period length for each channel is set to be 70 TUs or 71 TUs so that the total of the search period lengths of the search states using channel 1, channel 6, and channel 11 will be within 212 TUs. However, the start timing of the first search state (step S1203) is decided so that the period to execute the processing of the P2P search state using channel 6 will match the DW period of the NAN cluster to which the STA 101 has joined.

Upon entering the DW period, the STA 101 executes the search in the NAN DW period in parallel with the search in the P2P search state using channel 6 (step S1205). For example, the STA 101 transmits a subscribe message as a NAN in the DW period and a probe request as a P2P. In this case, either the subscribe message or the probe request can be transmitted first. However, if the start of the P2P search state is earlier than the start timing of the DW period, the period to receive a P2P probe response can be prolonged by transmitting the P2P probe request first. After transmitting the subscribe message and the probe request, the STA 101 waits for the publish message as a NAN and the probe response as a P2P. If a response is returned to either the NAN or the P2P, the STA 101 adds, as the search result, the information of the transmission source communication apparatus of the response and displays the added search results on the UI to notify the user of the results.

Upon completing the P2P search state, the STA 101 executes the P2P search processing in the P2P listen state (step S1207). The search processing period in this P2P listen state is N×100 TUs. In addition, in this period, unlike the processing according to the second embodiment, the search in the NAN DW period is not executed. Hence, the channel to be used need not be channel 6 and can be either channel 1 or channel 11.

Subsequently, the STA 101 determines, in the same manner as in the second embodiment, whether 512 TUs have elapsed from the start of the process in step S1203 (step S1208). If 512 TUs have elapsed (YES in step S1208), the process is returned to step S1202. On the other hand, if 512 TUs have not elapsed from the start of the process in step S1203 (NO in step S1208), the STA 101 enters the DOZE state for the amount of time remaining from 512 TUs (step S1209) to reduce the power consumption.

Figure 13:
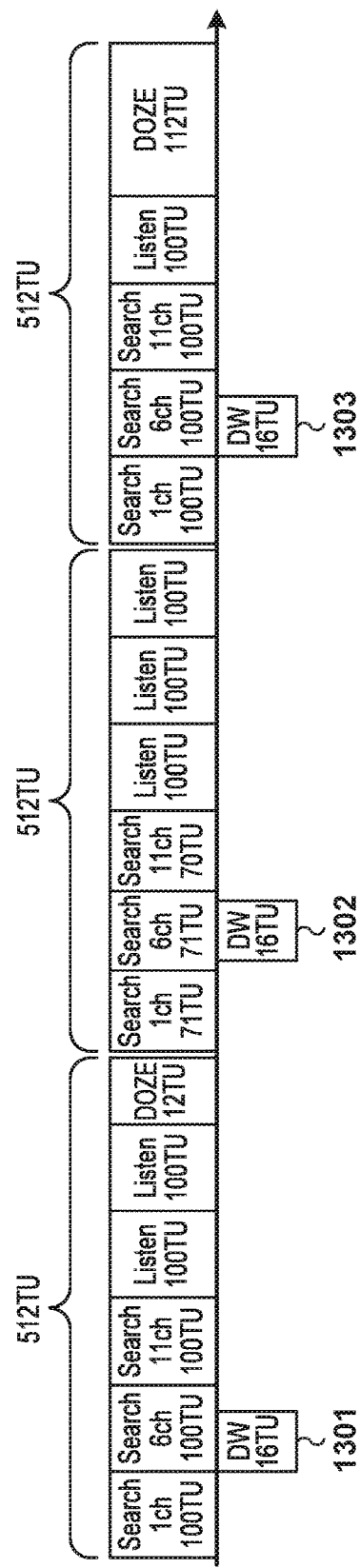
FIG. 13 is a view showing an overview of a case in which the third example of the search processing has been executed.

FIG. 13 is a view showing an image of the search processing when the random number N changes in the order of N=2, N=3, and N=1. A period of 512 TUs including a period 1301 shows an example of the case in which N=2, and while the search state processing using channel 6 is executed, a wait in the NAN DW period is executed for a period of 16 TUs. Subsequently, a listen state search is executed for 100×2 TUs, and the DOZE state is set for the remaining time.

A period of 512 TUs including a period 1302 shows an example of the case in which N=3. In this case, the period length of the listen state is 300 TUs. The remaining amount of time of 70+71+71 TUs is assigned to each of channel 1, channel 6, and channel 11 in the search state. Then, out of these channels, the search in the NAN DW period is executed in parallel during the search state using channel 6. At this time, note that the NAN search is controlled so that the search will be executed after 512 TUs have elapsed from the start of the previous DW period.

A period of 512 TUs including a period 1303 shows an example of the case in which N=1. The search in the listen state is executed for 100 TUs, and the DOZE period is 112 TUs. Then, in the same manner as in the periods 1301 and 1302, the search in the NAN DW period is executed in parallel at the time of the search state using channel 6. In addition, the NAN search is started after 512 TUs have elapsed from the start of the previous DW period.

At this time, by setting the cycle from step S1203 to step S1209 (step S1208 in some cases) to be 512 TUs, the timings of the DW period and the P2P search state using channel 6 can be matched easily.

In this embodiment, the NAN search is executed in parallel at the time of the search state. Hence, in the same manner as the second embodiment, the efficiency of the search can be increased. In addition, the processing of this embodiment is applicable to a case in which the channel to be used in the listen state is not channel 6.

Fourth Embodiment

Figure 14:
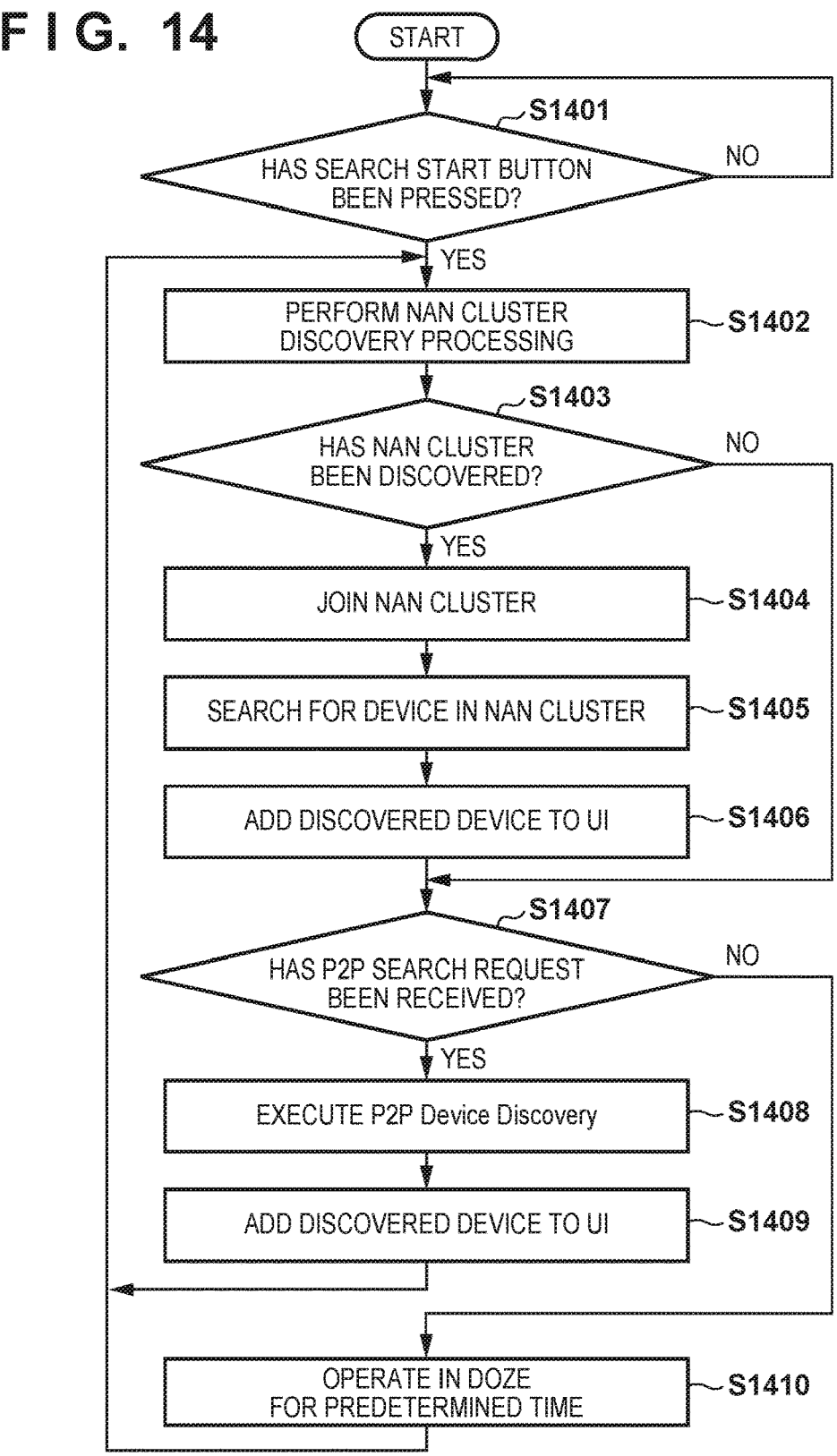
FIG. 14 is a flowchart illustrating the fourth example of the procedure of search processing for a service providing communication apparatus.

In this embodiment, a P2P search is started when a P2P search request is received after a search starts. The processing to be executed in this embodiment will be described with reference to FIG. 14. Here, note that differences from the processing of FIG. 4 will be described in detail.

In this embodiment, whether a P2P search request has been received in NAN cluster discovery processing in step S1402 and in the device search within a NAN cluster executed in step S1405 is stored. The P2P search request is a probe request, an action frame, or the like that includes a P2P IE. When a NAN search in the DW period until step S1406 ends, an STA 101 determines whether it has received a P2P request within a predetermined period (step S1407). If no P2P search request has been received (NO in step S1407), the STA 101 operates in a DOZE state (step S1410). That is, in this case, the STA 101 executes the same procedure as that of a normal NAN search. On the other hand, if it is determined that a P2P search request has been received within the predetermined period (YES in step S1407), the STA 101 starts the P2P search request (step S1408). If the P2P search request is discovered, it is displayed on a UI (step S1409).

In this embodiment, if the STA 101 receives a P2P search request while executing the NAN search, P2P search processing is started. Hence, the STA 101 starts the P2P search only when a P2P device exists nearby and can prolong the DOZE period when no P2P device exists nearby. Therefore, the power consumption of the STA 101 can be reduced.

In the above description, the STA 101 started the P2P search processing upon receiving the P2P search request while executing the NAN search, and vice versa. That is, if a NAN cluster is discovered while executing the P2P search, the STA 101 can join the NAN cluster and start the NAN search processing.

In this embodiment, after a P2P device is discovered, the P2P search and the NAN search are alternately executed in the same manner as the first embodiment. However, if it is processing in which the P2P search request is started by a P2P search request as a trigger, any kind of processing sequence may be used. For example, as in the second and the third embodiments, the NAN search can be executed in parallel for a part of a period while executing the P2P search.

The STA 101 can also start the P2P search immediately upon receiving the P2P search requests in the respective steps S1402 and S1405. The STA 101 can also return a response to the P2P search request immediately upon receiving the P2P search request. That is, the STA 101 can respond, upon receiving a probe request including a P2P IE, by giving a probe response that includes the P2P IE.

In the above-described embodiment, the STA 101 searches for a service providing communication apparatus. However, the present invention is not limited to the search for a service providing communication apparatus. For example, the STA 101 can be a service providing communication apparatus that searches for another communication apparatus which is searching for a predetermined service. In this case, at the time of the device search in the NAN cluster, rather than transmitting a subscribe message, the STA 101 can notify the other communication apparatus that it can provide the service by transmitting a publish message.

In the above-described embodiment, a search is executed based on Wi-Fi Direct services. However, a communication apparatus search based on Wi-Fi Direct may be executed.

In the above-described embodiment, a communication apparatus that transmitted the publish message in response to the subscribe message transmitted by the STA 101 is added to the search result. However, a communication apparatus other than the transmission source communication apparatus of the publish message received as the response to the subscribe message may be included in the search result. For example, a transmission source communication apparatus of a publish message transmitted by broadcast can be added to the search result. Hence, a NAN device search unit 303 need not always transmit a subscribe message.

The NAN device search unit 303 and a P2P search unit 304 do not designate specific services in the embodiments. However, each unit may search for only a communication apparatus that provides a specific service. For example, the NAN device search unit 303 can give, to the subscribe message, information indicating that it is searching for only a specific service. In addition, for a received publish message, only a specific service providing communication apparatus can be added to the search result. The P2P search unit 304 can also receive a response from only the specific service providing communication apparatus by giving information which indicates that it is looking for only a specific service, thereby narrowing down the search result. The specific service can be varied and may be, for example, a print service, a data exchange service, a screen mirroring service, or the like. When searching for a specific service, the NAN device search unit 303 and the P2P search unit 304 can search for a communication apparatus that provides the same type of service or search for a communication apparatus that provides a different type of service.

In the second and the third embodiments, the time of the search state is changed in accordance with the NAN DW period. However, the present invention is not limited to this. For example, the time of the P2P search state can be fixed to 100 TUs, and the NAN search may be executed only when the NAN DW period and the period using channel 6 during the P2P search overlap. Instead, in the P2P search, the listen state is N×100 TUs, and the search state is fixed to 300 TUs. As a result, a normal P2P search time is set, and an event in which the discovery of another communication apparatus or the like becomes difficult due to dynamic changes in the P2P search time can be avoided.

According to the present invention, it is possible to discover another communication apparatus that complies with one of a plurality of standards by a single user operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-187444, filed Sep. 24, 2015 which is hereby incorporated by reference herein in its entirety.

What is claimed is:

1. A communication apparatus, comprising:
one or more computers that cause the communication apparatus to:
accept a first search instruction at the communication apparatus from a user;
perform, in response to accepting the first search instruction, a first search process for searching a wireless network complying with a Wi-Fi Alliance Neighbor Awareness Networking standard and a first other communication apparatus that is in the wireless network and complies with the Wi-Fi Alliance Neighbor Awareness Networking standard by a first method complying with the Wi-Fi Alliance Neighbor Awareness Networking standard, and a second search process that is performed after the first search process and is for searching, over a plurality of channels, a second other communication apparatus by a second method complying with a communication standard other than the Wi-Fi Alliance Neighbor Awareness Networking standard; and
perform, after performing the second search process, the first search process without further accepting another search instruction from the user.

2. The apparatus according to claim 1, wherein the communication apparatus displays
information of the first other communication apparatus detected by the first search process and information of the first other communication apparatus detected by the second search process.

3. The apparatus according to claim 2, wherein
the communication apparatus displays the information of the first other communication apparatus and the information of the second other communication apparatus such that it is distinguishable that each of the first and second other communication apparatuses has been detected by which of the first search process and the second search process.

4. The apparatus according to claim 1, wherein
the second search process complies with Wi-Fi Direct.

5. The apparatus according to claim 1, wherein
in the first search process, the communication apparatus searches, as the wireless network, a cluster complying with the Wi-Fi Alliance Neighbor Awareness Networking standard and then searches, in a case where the cluster is detected, the first other communication apparatus belonging to the cluster.

6. The apparatus according to claim 1, wherein
in a case where a second search instruction different from the first search instruction is accepted, the communication apparatus performs the first search process, but not the second search process, and
in a case where a third search instruction different from both the first search instruction and the second search instruction is accepted, the communication apparatus performs the second search process, but not the first search process.

7. The apparatus according to claim 1, wherein the first search process is performed in a first channel and the second search process is performed over a plurality of channels including the first channel.

8. The apparatus according to claim 7, wherein
the second search process has a first state of waiting, in a second channel included in the plurality of channels, for a search signal from the second other communication apparatus and a second state of transmitting a search signal and waiting, in the plurality of channels, for a response signal, to the transmitted search signal, from the second other communication apparatus.

9. The apparatus according to claim 8, wherein the communication apparatus transmits the response signal in response to receiving the search signal in the first state.

10. The apparatus according to claim 8, wherein
the first channel is the same as the second channel.

11. The apparatus according to claim 1, wherein the one or more computers that cause the communication apparatus to perform the second search process in a case where the communication apparatus receives a wireless signal including an Information Element complying with a Wi-Fi Direct standard while performing the first search process performed immediately before the second search process, and not perform the second search process in a case where the communication apparatus does not receive the wireless signal while performing the first search process performed immediately before the second search process.

12. The apparatus according to claim 1, wherein search of the wireless network in the first search process is performed by waiting for a Discovery Beacon complying with the Wi-Fi Alliance Neighbor Awareness Networking standard for a predetermined period.

13. The apparatus according to claim 1, wherein in the first search process, in a case where a plurality of wireless networks are detected, the communication apparatus searches for the first other communication apparatus in a wireless network that has a highest cluster grade from among the plurality of wireless networks, wherein the cluster grade complies with the Wi-Fi Alliance Neighbor Awareness Networking standard and is set for each of the plurality of wireless networks.

14. The apparatus according to claim 1, wherein search of the first other communication apparatus in the first search process is performed by receiving a notification message for notifying that a service is being provided from the first other communication apparatus.

15. The apparatus according to claim 14, wherein search of the first other communication apparatus in the first search process is performed by transmitting a search message for searching for another communication apparatus that provides a service and receiving the notification message as a response to the search message.

16. The apparatus according to claim 1, wherein even in a case where the wireless network is detected by the first search process performed immediately before the second search process, the one or more computers that cause the communication apparatus to perform search of the wireless network and the first other communication apparatus that is in the wireless network as the first search process, after the second process is performed and without further accepting another search instruction from the user.

17. A control method for a communication apparatus, comprising:
   accepting a first search instruction at the communication apparatus from a user;
   performing, in response to accepting the first search instruction, a first search process for searching a wireless network complying with a Wi-Fi Alliance Neighbor Awareness Networking standard and a first other communication apparatus that is in the wireless network and complies with the Wi-Fi Alliance Neighbor Awareness Networking standard by a first method complying with the Wi-Fi Alliance Neighbor Awareness Networking standard and a second search process that is performed after the first search process and is for searching, over a plurality of channels, a second other communication apparatus by a second method complying with a communication standard other than the Wi-Fi Alliance Neighbor Awareness Networking standard; and
   performing, after performing the second search process, the first search process without further accepting another search instruction from the user.

18. A non-transitory computer-readable storage medium storing a computer program for causing a computer comprised in a communication apparatus to:
   accept a first search instruction at the communication apparatus from a user;
   perform, in response to accepting the first search instruction, a first search process for searching a wireless network complying with a Wi-Fi Alliance Neighbor Awareness Networking standard and a first other communication apparatus that is in the wireless network and complies with the Wi-Fi Alliance Neighbor Awareness Networking standard by a first method complying with the Wi-Fi Alliance Neighbor Awareness Networking standard, and a second search process that is performed after the first search process and is for searching, over a plurality of channels, a second other communication apparatus by a second method complying with a communication standard other than the Wi-Fi Alliance Neighbor Awareness Networking standard; and
   perform, after performing the second search process, the first search process without further accepting another search instruction from the user.

* * * * *